US 8,503,504 B2

(12) United States Patent
Dehmas

(10) Patent No.: US 8,503,504 B2
(45) Date of Patent: Aug. 6, 2013

(54) METHOD FOR ESTIMATING A CARRIER-FREQUENCY SHIFT IN A TELECOMMUNICATION SIGNALS RECEIVER, NOTABLY A MOBILE DEVICE

(75) Inventor: François Dehmas, Vif (FR)

(73) Assignee: Comissariat á l'Energie Atomique, Paris (FR)

( * ) Notice: Subject to any disclaimer, the term of this patent is extended or adjusted under 35 U.S.C. 154(b) by 837 days.

(21) Appl. No.: 12/710,005

(22) Filed: Feb. 22, 2010

(65) Prior Publication Data

US 2010/0215127 A1    Aug. 26, 2010

(30) Foreign Application Priority Data

Feb. 23, 2009  (FR) ...................................... 09 51144

(51) Int. Cl.
  *H04B 1/00*   (2006.01)
(52) U.S. Cl.
  USPC ........... 375/142; 375/150; 375/343; 375/344; 375/354; 370/503
(58) Field of Classification Search
  USPC ................. 375/142, 443, 150, 152, 326, 343, 375/344, 354, 362; 370/503, 509–512
  See application file for complete search history.

(56) References Cited

U.S. PATENT DOCUMENTS

| | | | |
|---|---|---|---|
| 6,760,363 B1 * | 7/2004 | Bettaieb | 375/150 |
| 6,850,557 B1 * | 2/2005 | Gronemeyer | 375/150 |
| 7,991,042 B2 * | 8/2011 | Wei et al. | 375/150 |
| 2007/0002937 A1 | 1/2007 | Min et al. | |
| 2008/0205492 A1 | 8/2008 | Gorday et al. | |

FOREIGN PATENT DOCUMENTS

| WO | WO 01/61880 A1 | 8/2001 |
|---|---|---|
| WO | WO 02/080404 A2 | 10/2002 |

OTHER PUBLICATIONS

C. Bernier et al., "An Ultra Low Power SoC for 2.4GHz IEEE802.15.4 Wireless Communications.", ESSCIRC 2008—34$^{th}$ European Solid-State Circuits Conference, XP-002550344, 2008, p. 426-429.

* cited by examiner

*Primary Examiner* — Dac Ha
(74) *Attorney, Agent, or Firm* — Oblon, Spivak, McClelland, Maier & Neustadt, L.L.P.

(57) ABSTRACT

This method for estimating a carrier-frequency offset in a telecommunication signals receiver comprises the following steps: computation of the partial correlations relating to several successive portions of a reference binary sequence, each partial correlation being computed between a portion of a signal received by the receiver at said carrier frequency, this signal comprising said reference binary sequence, and a predetermined portion of said reference binary sequence stored and/or generated by the receiver, in several possible relative positions between the received signal and the predetermined portion, and determination of the carrier-frequency offset from the computed partial correlations. It also comprises a step of selecting a synchronization position and the determination step comprises the estimation of a phase shift between computed partial correlations at the selected synchronization position.

15 Claims, 5 Drawing Sheets

METHOD FOR ESTIMATING A CARRIER-FREQUENCY SHIFT IN A TELECOMMUNICATION SIGNALS RECEIVER, NOTABLY A MOBILE DEVICE

The present invention relates to a method for estimating a carrier-frequency offset in a telecommunication signals receiver. It also relates to a mobile telecommunication device and a computer program capable of applying this method.

BACKGROUND OF THE INVENTION

Usually, between a transmitter and a receiver, the carrier frequency used in transmission for the modulation of a signal and the frequency used on reception for the demodulation of this signal can never be strictly identical. A phenomenon of carrier-frequency offset is therefore necessarily observed between the transmitter and the receiver. Moreover, depending on the accuracy of the oscillators used in the transmitters and the receivers, this offset may be greater or lesser and degrades the reception of the signals if no correction is made.

The invention applies notably to low-consumption telecommunications in which the receivers are mobile devices of which the energy consumption must be limited, that is to say in which it is necessary to implement the simplest possible digital algorithms involving a minimum of operations. Moreover, for these same consumption reasons, but also for questions of cost, the oscillators used in these receivers may have low accuracy. A good estimation and an effective correction of the carrier-frequency offset are therefore indispensable.

The same applies to the frequency offset of the transmitted coded symbols which is however directly linked to the carrier-frequency offset. Specifically, in a transmission/reception device, the carrier frequency and the sampling frequencies are generated based on one and the same oscillator. Therefore, between a transmitter and a receiver, the relative offset of the carrier frequency and the relative offset of the frequency of the coded symbols are equal. The estimation of only one of these offsets, in the first place the carrier-frequency offset, is therefore sufficient.

A field in question is, for example, that of low energy-consumption communications using the direct sequence spread spectrum usually called DSSS. According to this principle, an information symbol is associated with a binary spread sequence of L bits called "chips". These chips then modulate the carrier in phase or in frequency of a constant envelope signal. The communication is made in packet transmission mode and each packet comprises a preamble which is a predetermined sequence of DSSS coded symbols, this predetermined sequence being known to the receiver. This preamble therefore allows the synchronization of the receiver in order to demodulate a received packet.

The invention may therefore notably be applied in the particular field of wireless communications between a transmitter and a receiver the physical layer of which is as described in the standard IEEE 802.15.4 for the ISM ("Industrial, Scientific and Medical") band at 2.4-2.48 GHz, using a modulation of the O-QPSK type.

DESCRIPTION OF THE PRIOR ART

In this particular field, in which a signal is received by packets each containing a preamble comprising eight symbols #0 coded by DSSS on thirty-two chips, a method of estimation and correction of carrier-frequency offset is described in the American patent application published under the number US 2007/0002937. According to this method, the spread sequences received are differentiated in order to achieve a differential detection.

In this document, the estimation of carrier-frequency offset is more precisely carried out during the synchronization step which is performed on the preamble of any packet. The received signal is differentiated by computing the conjugate complex product between one sample and another delayed by one chip period (the time between the receipt of two chips of the spread sequence of the symbol #0), and then correlated with a reference binary sequence stored and/or generated by the receiver and corresponding to the spread sequence of the symbol #0. This process is optionally followed by an accumulation in order to accumulate the results relating to the eight spread sequences of the symbol #0 of the preamble. The signal thus obtained is used both for the synchronization and the estimation of the carrier-frequency offset.

In practice, when the synchronization is carried out, the real portions Re and the imaginary portions Im of the signal obtained provide a value that is a function of the carrier-frequency offset $\Delta f$:

Re=A cos($2\pi \Delta f T_C$) and Im=A sin($2\pi \Delta f T_C$), where A is the amplitude of the signal obtained and $T_C$ is the aforementioned chip period.

The carrier-frequency offset is then corrected by multiplying the correlation of each differentiated received spread sequence with all the possible differentiated spread sequences by the complex number A cos($2\pi \Delta f T_C$)−jA sin($2\pi \Delta f T_C$). It will be noted that, in the case of the standard IEEE 802.15.4 which involves an O-QPSK modulation, there are sixteen different possible pseudo-orthogonal spread sequences of thirty-two chips each.

It being known that each differentiation between samples offset by one chip period costs a complex multiplication, namely four real multiplications and two real additions, that thirty-one differentiations are computed per sequence, that the cost of the product of a sequence with a reference sequence is negligible because it consists only in changes of signs, that the computed sum for the correlation comprises thirty complex additions, namely sixty real additions, and that the correction of the carrier-frequency offset costs a complex multiplication, the overall cost of the decoding of each spread sequence received may result in:

(31×4+4)×16=128×16 real multiplications, and
(31×2+60+2)×16=124×16 real additions.

In terms of performance, it is shown that, with this method of differential detection, a packet error rate (PER) of 1% is reached for packets of 20 bytes (according to the standard IEEE 802.15.4 in the 2.4 GHz band), a relative carrier-frequency offset of 80 ppm (i.e. 80 parts per million) and a signal-to-noise ratio of 12.5 dB. With packets of a maximum size set at 127 bytes and the same relative carrier-frequency offset of 80 ppm, the packet error rate PER of 1% is reached for a signal-to-noise ratio of 14.5 dB.

Another solution consists in cutting the spread sequences into several successive portions, carrying out a partial correlation on each of the portions, then totaling the moduli of the computed partial correlations. This gives better performance by better resistance to carrier-frequency offset than when complete correlations are computed. Based on computed partial correlations, it is also possible to estimate the carrier-frequency offset when the latter becomes too great to be ignored.

The invention relates more precisely to this type of method for estimating a carrier-frequency offset in a telecommunication signals receiver, comprising:

a step of computing partial correlations relating to several successive portions of a reference binary sequence, each partial correlation being computed between a portion of a signal received by the receiver at said carrier frequency, this signal comprising said reference binary sequence, and a predetermined portion of said reference binary sequence stored and/or generated by the receiver, in several possible relative positions between the received signal and the predetermined portion, and a step of determining the carrier-frequency offset from the computed partial correlations.

Such a method is for example described in the international patent application published under number WO 01/61880. In this document, the carrier-frequency offset is estimated based on partial correlations computed by extraction of the argument of each of the complex numbers originating from the partial correlations, which is too costly in terms of computations and therefore a disadvantage in the case of an application requiring low energy consumption.

It may therefore be desirable to provide a powerful method for estimating a carrier-frequency offset that makes it possible to avoid the aforementioned problems and constraints.

SUMMARY OF THE INVENTION

The subject of the invention is thus a method for estimating a carrier-frequency offset in a telecommunication signals receiver, comprising:

a step of computing partial correlations relating to several successive portions of a reference binary sequence, each partial correlation being computed between a portion of a signal received by the receiver at said carrier frequency, this signal comprising said reference binary sequence, and a predetermined portion of said reference binary sequence stored and/or generated by the receiver, in several possible relative positions between the received signal and the predetermined portion, and a step of determining the carrier-frequency offset from the computed partial correlations, also comprising a step of selecting a synchronization position from the possible relative positions between the received signal and the reference binary sequence stored and/or generated by the receiver, and wherein the determination step comprises the estimation of a phase shift between computed partial correlations at the selected synchronization position.

Therefore, while retaining better performance than the differential solutions, this method is also simple to apply because it bases its estimation of the carrier-frequency offset on the estimation of a phase shift between computed partial correlations.

Optionally, the determination step comprises the estimation of an average phase shift between the successive partial correlations computed at the selected synchronization position, notably by estimating the mathematical expectation of the product between any two successive partial correlations computed at the selected synchronization position.

Also optionally, the carrier-frequency offset is determined according to the relation $$\hat{\Delta f} = \frac{N}{2\pi PL}\hat{\Delta \varphi},$$

where $\hat{\Delta f}$ is the carrier-frequency offset normalized by a sampling frequency of the received signal, $\hat{\Delta \varphi}$ is the estimated average phase shift, N is the number of successive partial correlations, L is the number of bits of the reference binary sequence, L/N then representing the number of bits of each portion on which a partial correlation is carried out, and P is the number of samples per bit of the reference binary sequence.

Also optionally, a method for estimating a carrier-frequency offset according to the invention may also comprise a step of correcting the carrier-frequency offset by compensating for this offset on the received signal with the aid of the determined value of the carrier-frequency offset.

Also optionally, the correction step comprises:

a step of computing successive phase-shift coefficients defined as a function of the determined value of the carrier-frequency offset, and a step of applying these successive phase-shift coefficients to samples of the received signal.

Also optionally, the successive phase-shift coefficients are computed by surroundings with the aid of tables of precomputed data.

Also optionally, the reference binary sequence is obtained by direct-sequence spread spectrum of a reference symbol, notably in the context of a transmission complying with the standard IEEE 802.15.4 providing a transmission of symbols by packets, the reference binary sequence being contained in the preamble of each received packet.

Also optionally, since the carrier-frequency offset is accompanied by a frequency offset of the transmitted symbols, the shift generated in the samples taken by the receiver is compensated for by the addition or deletion of a sample every time this shift becomes greater, ahead of or behind, than a half-sampling pitch.

A further subject of the invention is a computer program that can be downloaded from a communication network and/or saved on a computer-readable medium and/or executed by a processor, said program comprising program code instructions for the execution of the steps of a method for estimating a carrier-frequency offset as defined above when said program is executed on a computer.

A further subject of the invention is a mobile telecommunication device comprising means for estimating a carrier-frequency offset, these means comprising:

means for storing and/or generating a reference binary sequence, means for computing partial correlations relating to several successive portions of the reference binary sequence, each partial correlation being computed between a portion of a signal received by the receiver at said carrier frequency, this signal comprising the reference binary sequence, and a predetermined portion of said reference binary sequence stored and/or generated by the mobile device, according to several possible relative positions between the received signal and the predetermined portion, and means for determining the carrier-frequency offset from the computed partial correlations, said device further comprising means for selecting a synchronization position from the possible relative positions between the received signal and the reference binary sequence stored and/or generated by the mobile device, the determination means comprising means for estimating a phase shift between partial correlations computed at the selected synchronization position.

BRIEF DESCRIPTION OF THE DRAWINGS

The invention will be better understood with the aid of the following description given only as an example and made with reference to the appended drawings in which:

FIG. 5 represents in detail means for determining a carrier-frequency offset of the mobile device of FIG. 2.

DESCRIPTION OF THE PREFERRED EMBODIMENTS

Figure 1:
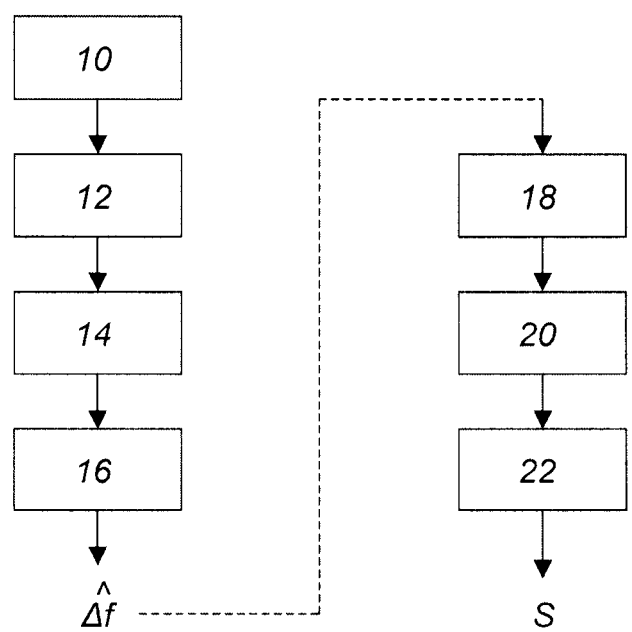
FIG. 1 illustrates the successive steps of a method for estimating a carrier-frequency offset according to one embodiment of the invention.

The method for estimating a carrier-frequency offset represented in FIG. 1 comprises a first step 10 of computing N partial correlations executed by a receiver of telecommunication signals. These N partial correlations relate to N successive portions of a reference binary sequence of L bits. Since the successive portions are for example all distinct, of the same size and with no overlap, each of them comprises L/N bits.

The invention applies to any type of communication, involving any type of reference binary sequence. But, in the rest of the description, it will be assumed, as a purely illustrative example, that the reference binary sequence is obtained by direct sequence spread spectrum DSSS of a reference symbol, in particular the symbol #0 of an O-QPSK modulation repeated eight times in the preamble of each packet of a signal transmitted in packet mode according to the standard IEEE 802.15.4. As indicated above, the spread sequence of the symbol #0 comprises L=32 bits called chips. It will be noted s or $(s_n)$, n being a sampling index. Preferably, the sampling pitch is a fraction of the chip period. By using P as the number of samples per chip, the index n of the spread sequence $(s_n)$ varies from 0 to PL−1.

r or $(r_n)$ indicates a signal received and transposed into baseband, also sampled at P samples per chip and comprising in particular the reference spread sequence in order to allow the signals $(r_n)$ and $(s_n)$ to be synchronized.

Each partial correlation is computed in step 10 between a portion of the received signal r and a predetermined portion of the reference spread sequence s, according to several possible relative positions between the received signal and the predetermined portion, according to the following relation:

$$CP_a^{(k)} = \sum_{q=0}^{\frac{PL}{N}-1} r_{n+q+k\frac{PL}{N}} \times s^*_{q+k\frac{PL}{N}},$$

where n is the index expressing the offset in number of samples between the signals r and s, k varying from 0 to N−1 is the index identifying the N partial correlations and the symbol "*" expresses the conjugate complex number.

Let $n_0$ be the value of n for which the signals r and s are synchronized. This then gives, for any n, $n_0 \leq n < n_0 + PL$: $r_n = A \times s_{n-n_0} \times \exp(2\pi j \Delta f n + j\theta) + b_n$, where A is the constant amplitude of the received signal, $\Delta f$ is the carrier-frequency offset normalized by the sampling frequency of the receiver, $\theta$ is a constant phase shift and $b_n$ is a centered Gaussian white noise sample, the received signal being assumed to be blemished by a centered Gaussian additive white noise.

Each partial correlation of index k is then expressed in the following manner:

$$CP_1^{(k)} =$$

$$\sum_{q=0}^{\frac{PL}{N}-1} \left(A \times s_{n-n_0+q+k\frac{PL}{N}} \times \exp\left(2\pi j \Delta f \left(n+q+k\frac{PL}{N}\right)+j\theta\right) + b_{n+q+k\frac{PL}{N}}\right) \times$$

$$s^*_{q+k\frac{PL}{N}}.$$

During the next selection step 12, the value of $n_0$ is determined in conventional manner. For example, $n_0$ is selected in the following manner:

$$n_0 = \operatorname*{Argmax}_n \left(\sum_{k=0}^{N-1} |CP_n^{(k)}|^2\right).$$

Since $\forall k, |s_k|=1$, this gives in $n_0$ a particular value for each partial correlation of index k:

$$CP_{P_a}^{(k)} =$$

$$\sum_{q=0}^{\frac{PL}{N}-1} A \times \exp\left(2\pi j \Delta f \left(n_0+q+k\frac{PL}{N}\right)+j\theta\right) + \sum_{q=0}^{\frac{PL}{N}-1} b_{n_0+q+k\frac{PL}{N}} \times s^*_{q+k\frac{PL}{N}},$$

from which it follows that $$CP_{P_a}^{(k)} = A \times \exp\left(2\pi j \Delta f \left(n_0+k\frac{PL}{N}\right)+j\theta\right) \sum_{q=0}^{\frac{PL}{N}-1} \exp(2\pi j \Delta f q) +$$

$$\sum_{q=0}^{\frac{PL}{N}-1} b_{n_0+q+k\frac{PL}{N}} \times s^*_{q+k\frac{PL}{N}},$$

and $$CP_{P_a}^{(k)} =$$

$$\begin{cases} A \times \exp\left(2\pi j \Delta f \left(n_0+k\frac{PL}{N}\right)+j\theta\right) \times \frac{\sin\left(\pi \Delta f \frac{PL}{N}\right)}{\sin(\pi \Delta f)} \exp\left(\pi j \Delta f \left(\frac{PL}{N}-1\right)\right) \\ + \sum_{q=0}^{\frac{PL}{N}-1} b_{n_0+q+k\frac{PL}{N}} \times s^*_{q+k\frac{PL}{N}} \end{cases}.$$

Then, we progress to steps 14 and 16 for determining the carrier-frequency offset from these particular values of the partial correlations.

In particular, during step 14, a phase shift between partial correlations computed at the selected synchronization position $n_0$ is estimated. More precisely, it is for example an average phase shift $\Delta\phi$ between the successive partial correlations computed at the selected synchronization position $n_0$ that is estimated. This average phase shift can be expressed as an argument of the following mathematical expectation:

$$E\left[CP^{*(k)}_{n_0} \times CP^{(k+1)}_{n_0}\right].$$

Taking the last expression of the partial correlations at $n_0$, the following expression is deduced therefrom for the aforementioned mathematical expectation:

$$E[CP_{n_0}^{*(k)} \times CP_{n_0}^{(k+1)}] = A^2 \left( \frac{\sin\left(\pi\Delta f \frac{PL}{N}\right)}{\sin(\pi\Delta f)} \right)^2 \exp\left(2\pi j\Delta f \frac{PL}{N}\right).$$

From which it follows that:

$$\Delta\varphi = \text{Arg}(E[CP_{n_0}^{*(k)} \times CP_{n_0}^{(k+1)}]) = 2\pi\Delta f \frac{PL}{N}.$$

Note that this average phase shift between successive partial correlations computed at the selected synchronization position $n_0$ is a direct function of the carrier-frequency offset normalized by the sampling frequency.

Since the aforementioned mathematical expectation can itself be estimated simply with the aid of a sum of products using the values of the partial correlations computed previously at $n_0$, an estimate $\hat{\Delta\varphi}$ of the average phase shift $\Delta\varphi$ is deduced therefrom:

$$\hat{\Delta\varphi} = \text{Arg}\left( \sum_{k=0}^{N-1} CP_{n_0}^{*(k)} \times CP_{n_0}^{(k+1)} \right).$$

In the rest of the description, the following will be noted $$S_{est} = \sum_{k=0}^{N-1} CP_{n_0}^{*(k)} \times CP_{n_0}^{(k+1)}.$$

During subsequent step 16, the carrier-frequency offset $\Delta f$ normalized by the sampling frequency is estimated with the aid of the following equation:

$$\hat{\Delta f} = \frac{N}{2\pi PL} \hat{\Delta\varphi}.$$

By writing $f_e$ as the sampling frequency and $\Delta_a f$ as the carrier-frequency offset expressed absolutely, and by noting that, in order to prevent the indetermination of $2\pi$ on the argument of the estimate of the aforementioned mathematic expectation, it is necessary that $|\Delta\varphi| \leq \pi$, a constraint on $\Delta_a f$ is then deduced therefrom:

$$|\Delta_a f| \leq \frac{N f_e}{2PL},$$

that is to say $$|\Delta_a f| \leq \frac{ND}{2L}$$

where D is the bit rate of the chips ($D = f_e/P$).

Once the carrier-frequency offset normalized by the sampling frequency is estimated, it is possible to decode the symbols contained in each data packet received by correlation with a version of the sixteen symbols (in O-QPSK modulation) known to the receiver. During the decoding, in a manner known per se, one complete correlation or several partial correlations relating to each possible symbol may be applied. In all cases, a correction must be made to the chips of the spread sequence received by taking account of the estimated carrier-frequency offset. This correction moreover makes it possible to limit the number of partial correlations to be envisaged if this decoding principle is chosen.

Therefore, during a step 18, successive phase-shift coefficients $\alpha_k$ are computed as a function of the value $\hat{\Delta f}$ estimated in step 16 and intended to be applied (by a complex multiplication) to the successive chips of the received spread sequence r in order to correct the carrier-frequency offset. These coefficients take the following form:

$$\alpha_k = \exp(-j2\pi \times P \times k \times \hat{\Delta f}).$$

Supposing that the current received spread sequence r begins at $n_1$, the moment when it is synchronized with the reference spread sequence, the correction is made in the following manner:

$v_{n_1+Pk} = r_{n_1+1} + \alpha_k$, $0 \leq k < N'$, where N' is the size of the partial correlations or of the total correlation chosen for the decoding of the sequence r and where the samples $v_n$ of the corrected spread sequence v are the values that are correlated with the reference spread sequences.

The successive phase-shift coefficients may be obtained by direct computation, but also with the aid of precomputed data tables in order to avoid overcomplicated trigonometric computations. A first table, for example, makes it possible to surround the mathematic expectation phase estimated in step 14 and a second table makes it possible to deduce therefrom the successive values of the coefficients $\alpha_k$.

In concrete terms, in the particular case presented above of an O-QPSK modulation communication, for a 2.48 GHz carrier frequency, a chip rate D=2 Mchips/s, L=32 chips, P=2 samples per chip, N=16 partial correlations for estimating the carrier-frequency offset, N'=4 partial correlations for the decoding, it is possible to choose a frequency pitch for correcting the carrier-frequency offset at 62 500 Hz, which corresponds to 1/32 of the chip rate and an offset pitch of 25 ppm.

This then gives $\text{Arg}(S_{est}) = 2\pi \times 4 \hat{\Delta f}$ and $\alpha_k = \exp(-j2\pi \times 2 \hat{\Delta f} \times k)$.

A first data table C is defined such that:

$$\forall k, 0 \leq k < 4, C[k] = \tan\left( 2\pi \left( \frac{1}{32} + \frac{2}{32}k \right) \right).$$

A second data table Tab is defined such that:

$$\forall n, 0 \leq n < 32, \text{Tab}[n] = \exp\left( j2\pi \frac{n}{32} \right).$$

Because of the trigonometric symmetry of the elements of this second table of thirty-two values, it would be possible to be satisfied with storing only eight values, or even simply four, by using the symmetry between the sine and cosine functions in the angular interval $[0; \pi/2]$.

Based on the value of $S_{est}$ obtained in step 14, the values of $\text{Re}(S_{est})$ and $\text{Im}(S_{est})$ are computed. The index $k_0$ is determined such that $$C[k_0] \le \left|\frac{\text{Im}(S_{est})}{\text{Re}(S_{est})}\right| < C[k_0 + 1],$$

then, with the aid of the index $k_0$ that has been found and of the signs of $\text{Re}(S_{est})$ and $\text{Im}(S_{est})$, the index $n_0$ is deduced such that $\text{Tab}[2n_0]$ is an approximation of $S_{est}$ in angular value.

If $n_0$ is less than or equal to 8, that is to say if the carrier-frequency offset normalized by the sampling frequency is positive, the eight successive phase-shift coefficients to be applied to the eight chips of the received spread sequence of each of the four partial correlations computed for the decoding are deduced therefrom, according to the following relation:

$\alpha_k = \text{Tab}[k \times n_0 \bmod 32]^*$, where the symbol "*" expresses the conjugate complex number.

If $n_0$ is strictly greater than 8, that is to say if the carrier-frequency offset normalized by the sampling frequency is negative, the eight successive phase-shift coefficients are deduced therefrom according to the following relation:

$\alpha_k = \text{Tab}[k \times (n_0 - 16) \bmod 32]^*$.

Then, during a correlation step 20, on the one hand, the received current spread sequence r is corrected with the aid of the coefficients $\alpha_k$ to provide the corrected spread sequence v and, on the other hand, the corrected spread sequence v is correlated with each of the possible reference spread sequences according to the chosen method of decoding from partial correlations or from total correlation. In the particular case of an O-QPSK modulation communication, sixteen different correlation values are provided, each corresponding to one of the reference spread sequences. The absolute value of each of these sixteen correlation values is then computed.

Finally, during a final selection step 22, amongst the absolute values obtained in the preceding step, the maximum value is adopted and the corresponding reference spread sequence is selected. In this way the corresponding symbol S is deduced therefrom.

If the number of partial correlations computed for the decoding is N'=4, since each correction in a partial correlation with the aid of the coefficients $\alpha_k$ costs seven complex multiplications, or twenty-eight real multiplications and fourteen real additions, since each computation of absolute value for each partial correlation involves two real multiplications and one real addition, since the computation of an overall absolute value for all of the partial correlations adds a further three real additions, since the cost of the product of a sequence with a reference sequence is negligible because it consists only in changes of signs and since the sum computed for each partial correlation comprises seven real additions, the overall cost of the decoding of each received spread sequence can result in:
  (28+2)×4=120×16 real multiplications, and
  (14+1+7)×4+3=91×16 real additions.

It can be seen that this solution requires 8×16 real multiplications and 33×16 real additions less than the solution recommended in document US 2007/0002937. It is therefore less complex in terms of elementary computations to be carried out.

In terms of performance, simulations show that, for packets of 20 bytes and a relative carrier-frequency offset of 80 ppm (i.e. 80 parts per million), this solution leads to a packet error rate PER of 1% for a signal-to-noise ratio of 11.5 dB (instead of 12.5 dB in the differential detection solution of document US 2007/0002937). With packets of a maximum size set at 127 bytes and the same relative carrier-frequency offset of 80 ppm, the packet error rate PER of 1% is achieved for a signal-to-noise ratio of 13.7 dB (instead of 14.5 dB in the differential detection solution of document US 2007/0002937). There is therefore a gain of approximately 1 dB relative to the differential detection solution.

It will be noted that the method for estimating a carrier-frequency offset described above may for example be carried out by a computer program that can be downloaded from a communication network and/or stored on a medium that can be read by a computer and/or that can be executed by a processor.

Figure 2:
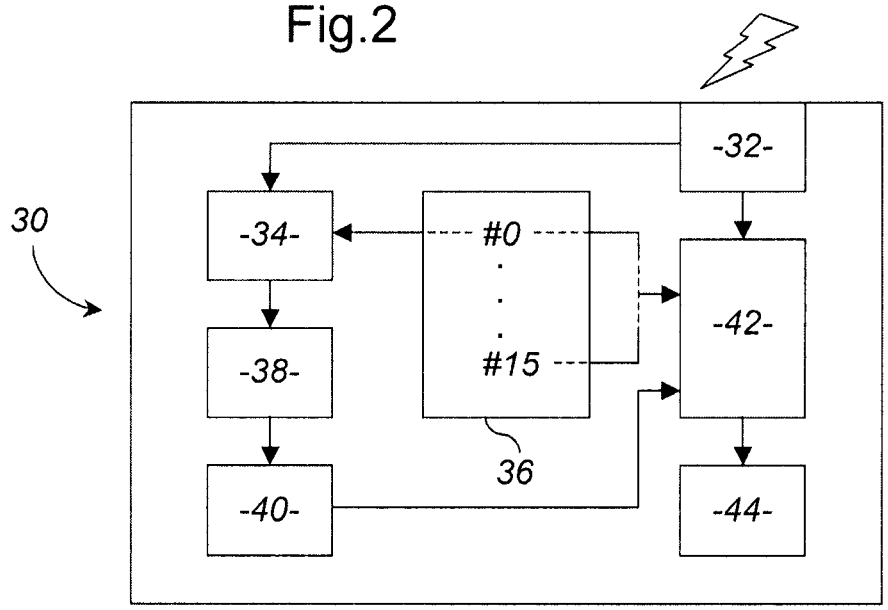
FIG. 2 represents schematically the general structure of a mobile telecommunication device according to one embodiment of the invention.

FIG. 2 represents schematically the general functional structure of a receiver 30 of telecommunication signals designed for applying the method for estimating a carrier-frequency offset described above, for example a mobile telecommunication device capable of communicating according to the standard IEEE 802.15.4.

The mobile device 30 for this purpose comprises an interface 32 for transmitting/receiving signals according to the standard IEEE 802.15.4. The signals received in O-QPSK modulation by the mobile device 30 are transposed into baseband thanks to an oscillator (not shown).

In order to estimate the carrier-frequency offset generated by this oscillator, the preamble of a received packet is transmitted to means 34 for computing partial correlations. These partial correlations relate to several successive portions of the reference spread sequence of the symbol #0, each partial correlation being computed between a portion of the preamble in baseband, this preamble comprising a succession of eight reference spread sequences of the symbol #0, and a predetermined portion of the same reference binary sequence stored and/or generated by the mobile device 30, in several possible relative positions between the received preamble and the predetermined portion.

According to the standard IEEE 802.15.4, the carrier-frequency offset must be less than 40 ppm in transmission, which allows a maximum offset of 80 ppm between the transmitter and the receiver. Moreover, sensitivity must be better than −85 dBm, the latter being defined as the minimum power necessary in reception in order to obtain a packet error rate of less than 1% with packets of 20 bytes.

For a maximum carrier frequency of 2.48 GHz, a carrier-frequency offset at 80 ppm corresponds to 200 kHz. As it has been seen above that $$|\Delta_a f| \le \frac{ND}{2L},$$

this requires that $$\frac{ND}{2L} > 200 \text{ kHz}.$$

Namely, since D=2 Mchips/s and L=32, N>6.4.

For spread sequences with 32 chips, this makes it possible to envisage 8, 16 or 32 partial correlations. It can be shown that N=16 is a beneficial choice in terms of error rate in the presence of a carrier-frequency offset.

The computation means 34 will be explained in detail with reference to FIGS. 3 and 4, in this particular case of N=16, with a sampling such that P=2.

The reference spread sequences are stored and/or generated in storage and/or generation means 36 of the mobile device 30. The reference spread sequence corresponding to the symbol #0 is therefore in particular provided by these storage and/or generation means 36 to the computation means 34.

The mobile device 30 also comprises means 38 for selecting a synchronization position $n_0$ from the possible relative positions between the received signal and the reference binary sequence stored and/or generated by the mobile device. These selection means 38 are designed to apply step 12 described above. They are therefore connected to the computation means 34 in order to retrieve the values of the partial correlations at each possible relative position.

The mobile device 30 also comprises means 40 for determining the carrier-frequency offset by estimating a phase shift between partial correlations computed in the selected synchronization position. They are therefore connected to the selection means 38 which provide them with this synchronization position. They are designed to apply step 14 described above.

The determination means 40 will be explained in detail with reference to FIG. 5, in this particular case of N=16, with a sampling such that P=2.

The mobile device 30 also comprises means 42 for decoding and correcting a received and demodulated signal in baseband provided by the interface 32. They are designed to apply steps 18 and 20 described above, that is to say to:
compute successive phase-shift coefficients, defined as a function of the value of the carrier-frequency offset determined by the means 40,
correct the signal received and demodulated in baseband with the aid of these successive phase-shift coefficients, and
correlate the corrected received signal with each of the reference spread sequences corresponding to the reference symbols #0 to #15 stored and/or generated by the means 36, and calculate the absolute values of each of these correlations.

These decoding and correction means 42 will be explained in detail with reference to FIGS. 7 and 8, in this particular case of N'=4, with a sampling such that P=2.

Finally, the mobile device 30 comprises means 44 for selecting, from the absolute values provided by the decoding and correction means 42, the maximum value and the corresponding symbol S. They are designed to apply step 22 described above.

Figure 3:
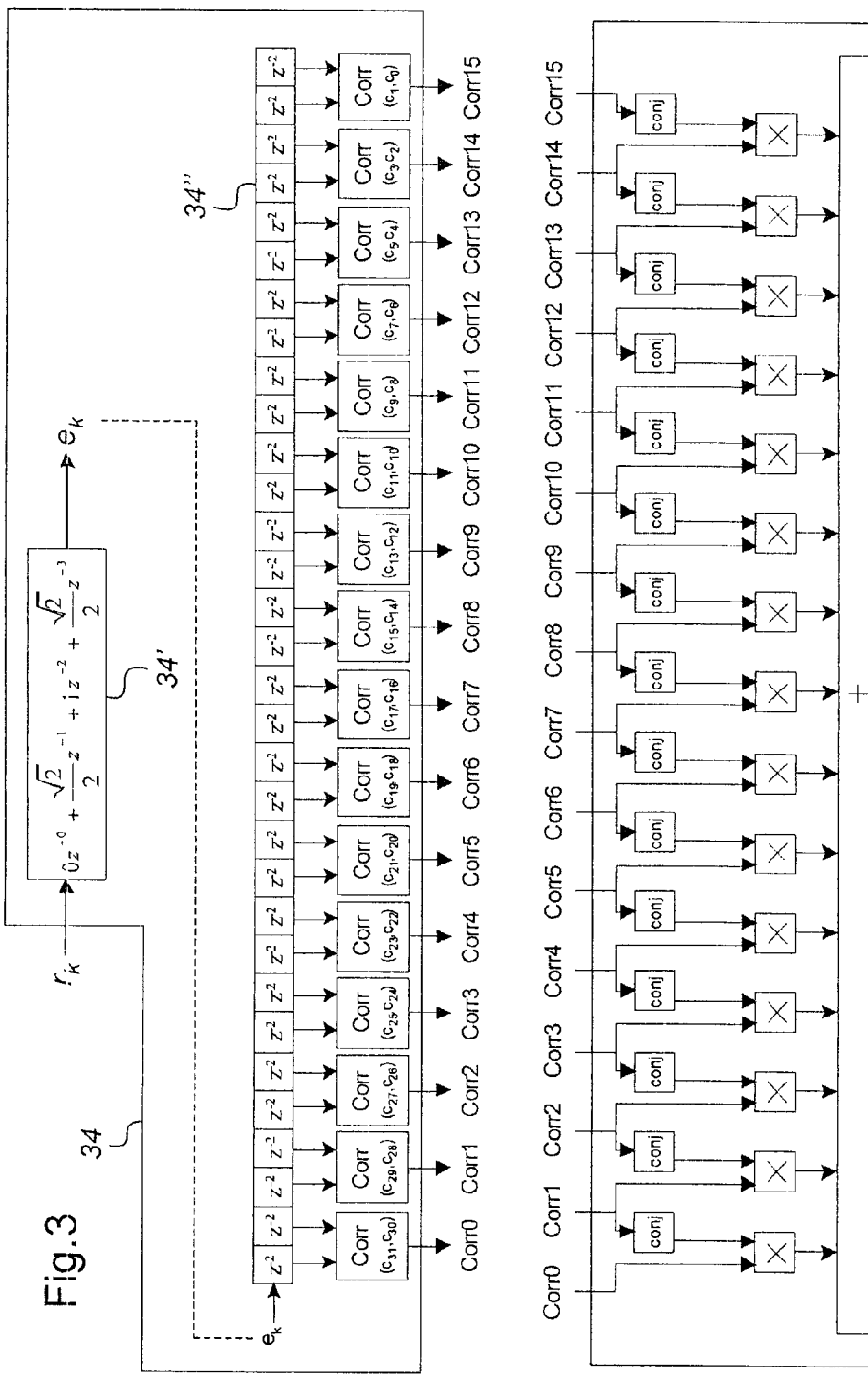
FIGS. 3 and 4 represent in detail means for computing partial correlations of the mobile device of FIG. 2.

FIG. 3 represents in detail the computation means 34 in the particular case of N=16, with a sampling such that P=2. In this case, each partial correlation relates to four samples covering two chips. The computation of the N=16 partial correlations marked Corr0 to Corr15 is divided into two computation modules.

A first module 34' carries out a filtering of the received signal r over a window of four samples, this filtering being adapted to the semisinusoidal shape of each chip. It provides a signal e to the second module 34" of the computation means 34.

The second module 34" comprises 32 delay elements of 2 samples each placed in series and providing 32 samples to 16 partial correlators Corr ($c_{31-2k}$, $c_{31-2k-1}$), $0 \leq k \leq 15$, each relating to two successive chips of the reference spread sequence linked to the symbol #0. This reference spread sequence is marked ($c_{31}, \ldots, c_0$) in FIG. 3.

Figure 4:
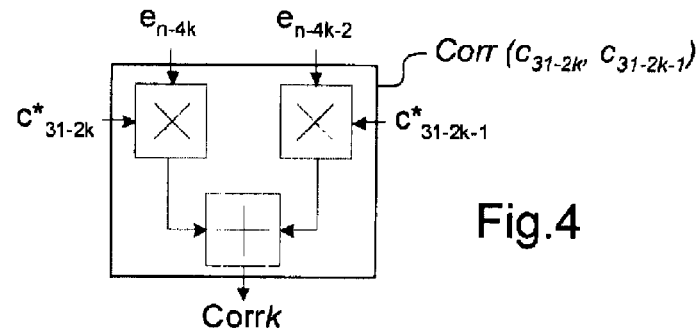

A random partial correlator Corr ($c_{31-2k}$, $c_{31-2k-1}$) of the second module 34" is represented in detail in FIG. 4. Two samples $e_{n-4k}$ and $e_{n-4k-2}$ of the signal e, shifted by one chip period, are provided at the input of this partial correlator. They are multiplied respectively by the conjugate complex values $c^*_{31-2k}$ and $c^*_{31-2k-1}$ of two successive chips forming a portion of the reference spread sequence. The two values obtained are then added together to provide the result of partial correlation Corrk at a possible relative position between the received signal and the reference portion in question. At the next sampling moment, two subsequent samples $e_{n-4k+1}$ and $e_{n-4k-1}$ of the signal e, shifted by one chip period, are provided at the input of this partial correlator in order to provide the partial correlation result Corrk at a subsequent possible relative position between the received signal and the reference portion in question. This computation of partial correlation is repeated for all the possible relative positions between the received signal and the reference portion in question, namely PL=64 different relative positions.

As indicated above with reference to step 12 of FIG. 1, this computation of partial correlations carried out for PL=64 different relative positions makes it possible to select a synchronization position $n_0$. 16 particular values of the partial correlations Corr0 to Corr15 repeated in FIG. 5 correspond to this synchronization position. By taking the preceding notations, the particular values provided to the determination means 40 are:

$$\forall k, 0 \leq k < 16, \text{Corr}k = CP_{n_0}^{(15-k)}.$$

As illustrated in FIG. 5, the determination means 40 comprise 15 multipliers in order to multiply each partial correlation Corr0 to Corr14 with the complex conjugate value of the subsequent partial correlation Corr1 to Corr15. The 15 results of these multiplications are added together in order to provide at the output the signal $S_{est}$ defined above.

Figure 6:
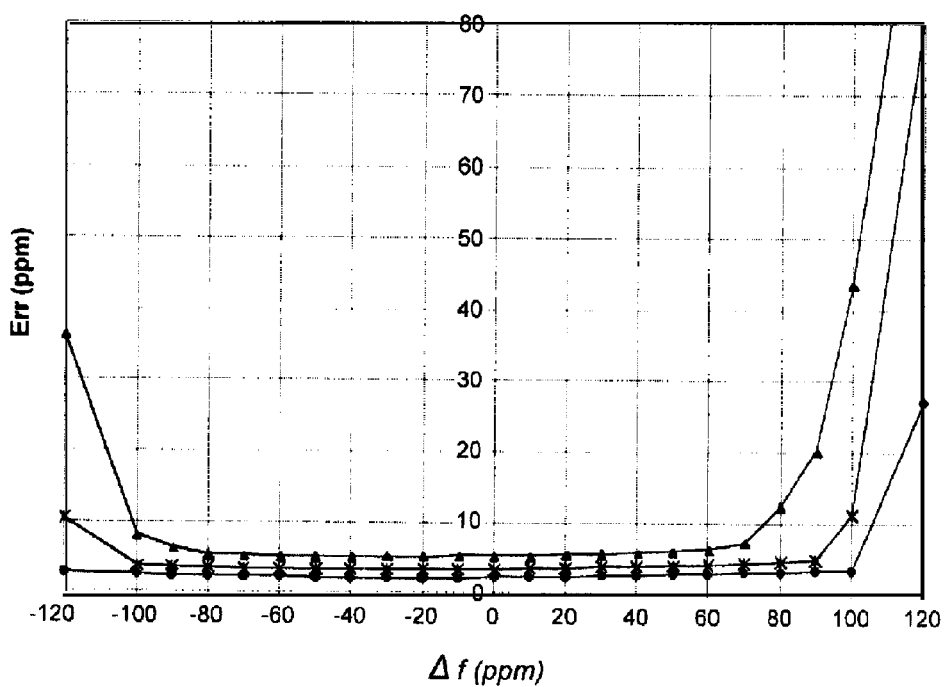
FIG. 6 illustrates graphically the performance of the determination means of FIG. 5 in terms of average quadratic error.

The accuracy obtained by taking the argument of the signal $S_{est}$ provided by the determination means 40 as an estimator of the carrier-frequency offset is illustrated in FIG. 6. The three curves shown in this figure are obtained from simulations in the presence of Gaussian white noise for various values of signal-to-noise ratio: 12 dB, 15 dB and 20 dB. Naturally, the accuracy of the estimate is better the higher the signal-to-noise ratio. The curve that is more particularly of interest is that which corresponds to a signal-to-noise ratio of 15 dB because it corresponds to the target sensitivity of the receiver. In this case, the average quadratic error on the estimate of the carrier-frequency offset is less than 5 ppm over a range of this carrier-frequency offset of between −80 ppm and +80 ppm.

Figure 7:
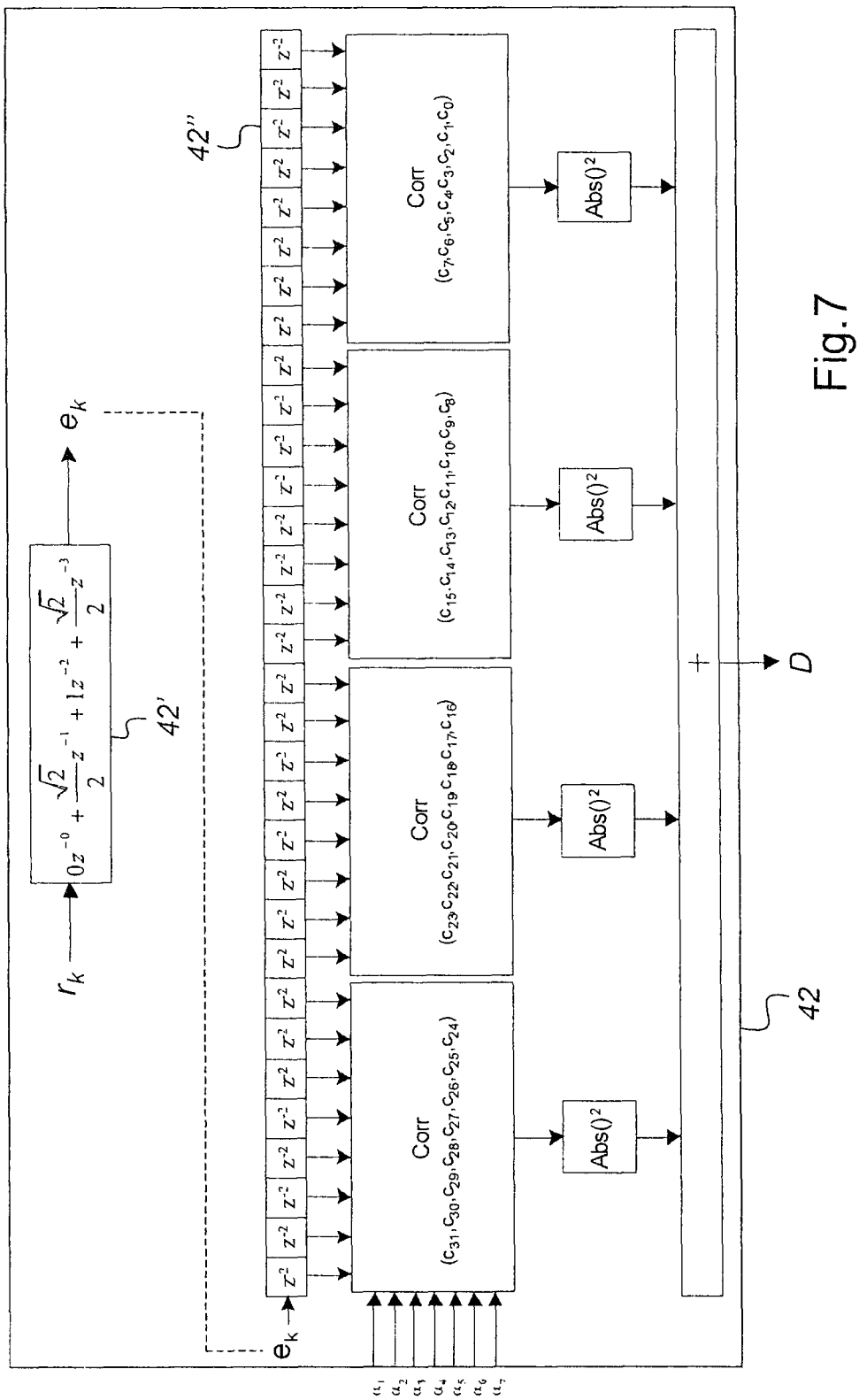
FIGS. 7 and 8 represent in detail decoding and correction means of the mobile device of FIG. 2.

FIG. 7 represents in detail the decoding and correction means 42 in the particular case of N'=4, with a sampling such that P=2. In this case, each partial correlation of decoding relates to sixteen samples covering eight chips. The computation of the N'=4 partial correlations of decoding is divided into two computation modules.

A first module 42', identical to the module 34', carries out a filtering of the signal r adapted to the semisinusoidal shape of each chip. It provides a signal e to the second module 42" of the decoding and correction means 42.

The second module 42" comprises 32 delay elements of 2 samples each placed in series and providing 32 samples to 4 partial correlators Corr ($c_{31-8k}$, $c_{31-8k-1}$, $c_{31-8k-2}$, $c_{31-8k-3}$, $c_{31-8k-4}$, $c_{31-8k-5}$, $c_{31-8k-6}$, $c_{31-8k-7}$), $0 \leq k < 4$, each relating to 8 successive chips of one of the 16 reference spread sequences connected to the symbols #0 to #15. This random spread sequence on which the 4 partial correlations are computed is noted for simplification ($c_{31}, \ldots, c_0$) in this figure and the next.

Figure 8:
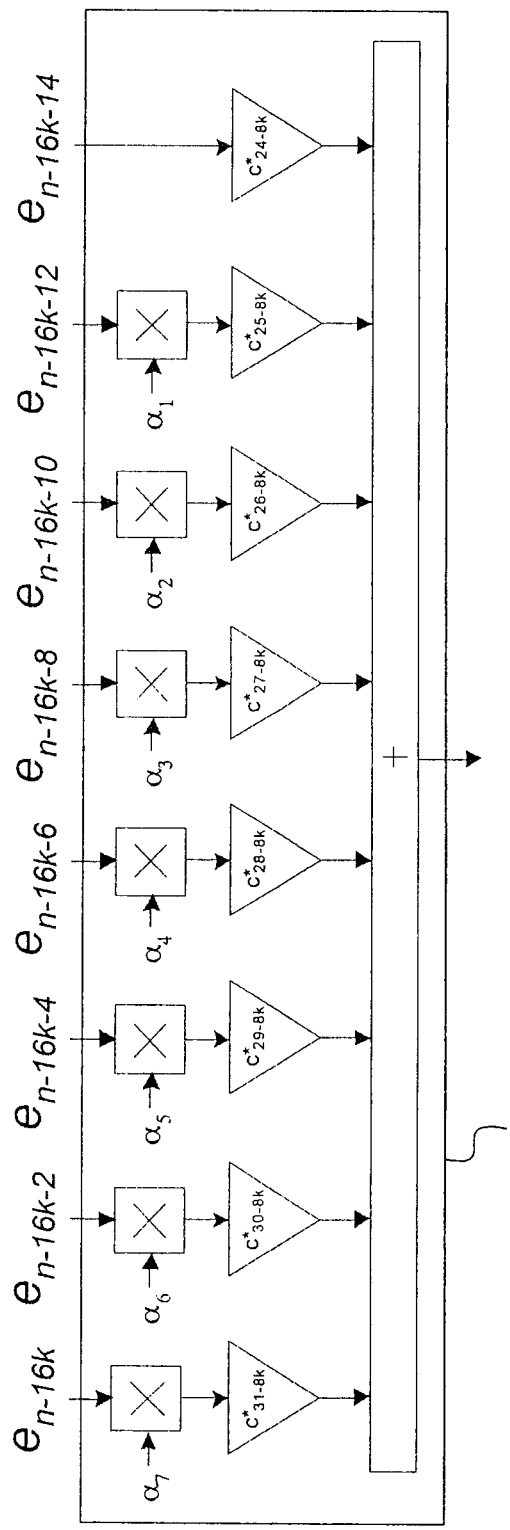

A random partial correlator Corr ($c_{31-8k}$, $c_{31-8k-1}$, $c_{31-8k-2}$, $c_{31-8k-3}$, $c_{31-8k-4}$, $c_{31-8k-5}$, $c_{31-8k-6}$, $c_{31-8k-7}$) of the second module 42'' is shown in detail in FIG. 8. Eight samples $e_{n-16k}$, $e_{n-16k-2}$, $e_{n-16k-4}$, $e_{n-16k-6}$, $e_{n-16k-8}$, $e_{n-16k-10}$, $e_{n-16k-12}$ and $e_{n-16k-14}$ of the signal e, shifted two by two by one chip period, are provided at the input of this partial correlator. They are multiplied respectively by the eight successive phase-shift coefficients $\alpha_7$ to $\alpha_0$ (however where $\alpha_0=1$, which removes one multiplication) in order to carry out the correction of the carrier-frequency offset, then correlated with the eight successive chips $c_{31-8k}$, $c_{31-8k-1}$, $c_{31-8k-2}$, $c_{31-8k-3}$, $c_{31-8k-4}$, $c_{31-8k-6}$, $c_{31-8k-6}$, $c_{31-8k-7}$ forming a portion of the reference spread sequence in question. The eight values obtained are then added together in order to provide the partial correlation result in question.

As illustrated in FIG. 7, the module 42'' then carries out the computation of the squared absolute value of this result for each partial correlator and then adds the four absolute partial values in order to provide a decision variable D of the symbol in question.

The aforementioned computations carried out by the decoding and correction means 42 are repeated for each symbol #0 to #15.

Another effect of the carrier-frequency offset is to equally generate a frequency offset of the symbols. These two frequency offsets are directly connected by the following relation:

$$\delta f = \frac{\Delta_a f}{f_c},$$

where $\delta f$ represents both the relative offset of the frequency of the symbols and the relative offset of the carrier frequency, $\Delta_a f$ is the absolute offset of the carrier frequency and $f_c$ is the carrier frequency.

The relative offset of the frequency of the symbols causes a regular shift of the synchronization of the symbols at the receiver. If $t_0$ is an initial moment in which the synchronization at the level of the symbols is assumed to be perfect, the shift of the symbols as a function of the time t is $-(t-t_0)\delta f$ ($\delta f$ being assumed to be much less than 1).

This expression reflects the fact that, when $\delta f$ is positive, the receiver samples too quickly relative to the transmitter, which generates a delay relative to the received signal: it is then necessary to remove a sample when this shift is greater than a half-sampling pitch. It is deduced from this that, after $1/2\delta f$ samples, and then every $1/\delta f$ samples, it is necessary to remove a sample in order to compensate for this shift.

When $\delta f$ is negative, the receiver is not sampling fast enough relative to the transmitter, which generates an advance relative to the received signal: it is then necessary to add a sample when this shift is greater than a half-sampling pitch. It is deduced from this that, after $1/2\delta f$ samples, and then every $1/\delta f$ samples, it is necessary to add a sample in order to compensate for this shift.

When it is desired to determine the recurrence of the removals or additions of samples with the aid of a table of precomputed values, it is sufficient to associate with the table Tab defined above, a table TabSymb such that TabSymb[0]= infinity and $$\forall\, i,\; 0 \leq i < 8,\; TabSymb[i] = \frac{f_c}{2i\Delta_a f_{min}}.$$

For $f_c$=2.45 GHz and $\Delta_a f_{min}$=62 500 Hz, this gives TabSymb[1]=19 600, TabSymb[2]=9800, etc.

A value given by this table gives the position of the first sample to be added or removed, the subsequent ones then being spaced at twice this value.

It appears clearly that the method and the device described above make it possible to enhance the existing solutions by exhibiting better performance in terms of accuracy of the estimate and simplicity of computation.

The invention claimed is:

1. A method for estimating a carrier-frequency offset in a telecommunication signals receiver, comprising:
a step of computing partial correlations relating to several successive portions of a reference binary sequence, each partial correlation being computed between a portion of a signal received by the receiver at said carrier frequency, the signal comprising said reference binary sequence, and a predetermined portion of said reference binary sequence stored and/or generated by the receiver, in several possible relative positions between the received signal and the predetermined portion, and
a step of determining the carrier-frequency offset from the computed partial correlations,
said method comprising a step of selecting a synchronization position from the possible relative positions between the received signal and the reference binary sequence stored and/or generated by the receiver, and wherein the determination step comprises the estimation of a phase shift between computed partial correlations at the selected synchronization position.

2. The method for estimating a carrier-frequency offset as claimed in claim 1, wherein the determination step comprises the estimation of an average phase shift between the successive partial correlations computed at the selected synchronization position, notably by estimating the mathematical expectation of the product between any two successive partial correlations computed at the selected synchronization position.

3. The method for estimating a carrier-frequency offset as claimed in claim 2, wherein the carrier-frequency offset is determined according to the relation $$\hat{\Delta f} = \frac{N}{2\pi PL}\hat{\Delta\varphi},$$

where $\hat{\Delta f}$ is the carrier-frequency offset normalized by a sampling frequency of the received signal, $\hat{\Delta\varphi}$ is the estimated average phase shift, N is the number of successive partial correlations, L is the number of bits of the reference binary sequence, L/N then representing the number of bits of each portion on which a partial correlation is carried out, and P is the number of samples per bit of the reference binary sequence.

4. The method for estimating a carrier-frequency offset as claimed in claim 2, wherein the reference binary sequence is obtained by direct-sequence spread spectrum of a reference symbol, notably in the context of a transmission complying with the standard IEEE 802.15.4 providing a transmission of symbols by packets, the reference binary sequence being contained in the preamble of each received packet.

5. The method for estimating a carrier-frequency offset as claimed in any one of claims 1 to 3, also comprising a step of correcting the carrier-frequency offset by compensating for the offset on the received signal with the aid of the determined value of the carrier-frequency offset.

6. The method for estimating a carrier-frequency offset as claimed in claim 5, wherein the correction step comprises:
- a step of computing successive phase-shift coefficients defined as a function of the determined value of the carrier-frequency offset, and
- a step of applying these successive phase-shift coefficients to samples of the received signal.

7. The method for estimating a carrier-frequency offset as claimed in claim 6, wherein the successive phase-shift coefficients are computed by surroundings with the aid of tables of precomputed data.

8. The method for estimating a carrier-frequency offset as claimed in claim 7, wherein the reference binary sequence is obtained by direct-sequence spread spectrum of a reference symbol, notably in the context of a transmission complying with the standard IEEE 802.15.4 providing a transmission of symbols by packets, the reference binary sequence being contained in the preamble of each received packet.

9. The method for estimating a carrier-frequency offset as claimed in claim 3, wherein the reference binary sequence is obtained by direct-sequence spread spectrum of a reference symbol, notably in the context of a transmission complying with the standard IEEE 802.15.4 providing a transmission of symbols by packets, the reference binary sequence being contained in the preamble of each received packet.

10. The method for estimating a carrier-frequency offset as claimed in claim 6, wherein the reference binary sequence is obtained by direct-sequence spread spectrum of a reference symbol, notably in the context of a transmission complying with the standard IEEE 802.15.4 providing a transmission of symbols by packets, the reference binary sequence being contained in the preamble of each received packet.

11. The method for estimating a carrier-frequency offset as claimed in claim 5, wherein the reference binary sequence is obtained by direct-sequence spread spectrum of a reference symbol, notably in the context of a transmission complying with the standard IEEE 802.15.4 providing a transmission of symbols by packets, the reference binary sequence being contained in the preamble of each received packet.

12. The method for estimating a carrier-frequency offset as claimed in claim 1, wherein the reference binary sequence is obtained by direct-sequence spread spectrum of a reference symbol, notably in the context of a transmission complying with the standard IEEE 802.15.4 providing a transmission of symbols by packets, the reference binary sequence being contained in the preamble of each received packet.

13. The method for estimating a carrier-frequency offset as claimed in claim 12, wherein, since the carrier-frequency offset is accompanied by a frequency offset of the transmitted symbols, the shift generated in the samples taken by the receiver is compensated for by the addition or deletion of a sample every time the shift becomes greater, ahead of or behind, than a half-sampling pitch.

14. A non-transitory computer-readable storage medium storing a program for causing a computer to implement a computer program comprising program code instructions for the execution of the steps of a method for estimating a carrier-frequency offset as claimed in claim 1.

15. A mobile telecommunication device comprising means for estimating a carrier-frequency offset, these means comprising:
- means for storing and/or generating a reference binary sequence,
- means for computing partial correlations relating to several successive portions of the reference binary sequence, each partial correlation being computed between a portion of a signal received by the receiver at said carrier frequency, the signal comprising the reference binary sequence, and a predetermined portion of said reference binary sequence stored and/or generated by the mobile device, according to several possible relative positions between the received signal and the predetermined portion, and
- means for determining the carrier-frequency offset from the computed partial correlations,
- said device comprising means for selecting a synchronization position from the possible relative positions between the received signal and the reference binary sequence stored and/or generated by the mobile device, the determination means comprising means for estimating a phase shift between partial correlations computed at the selected synchronization position.

* * * * *